(12) United States Patent
Kahlert et al.

(10) Patent No.: US 9,156,516 B2
(45) Date of Patent: Oct. 13, 2015

(54) TWO-WHEELED BATTERY-POWERED VEHICLE

(76) Inventors: Ulrich Kahlert, Saarbrücken (DE); Chris Fawcett, Whitehead (GB)

( * ) Notice: Subject to any disclaimer, the term of this patent is extended or adjusted under 35 U.S.C. 154(b) by 0 days.

(21) Appl. No.: 14/110,262

(22) PCT Filed: Apr. 5, 2012

(86) PCT No.: PCT/EP2012/056339
§ 371 (c)(1), (2), (4) Date: Nov. 25, 2013

(87) PCT Pub. No.: WO2012/136798
PCT Pub. Date: Oct. 11, 2012

(65) Prior Publication Data
US 2014/0069733 A1 Mar. 13, 2014

Related U.S. Application Data

(60) Provisional application No. 61/471,888, filed on Apr. 5, 2011.

(30) Foreign Application Priority Data

Mar. 2, 2012 (EP) .................................... 12157980

(51) Int. Cl.
*B62K 3/00* (2006.01)
*B62H 1/12* (2006.01)
(Continued)

(52) U.S. Cl.
CPC *B62K 3/007* (2013.01); *B62H 1/12* (2013.01); *B62J 11/00* (2013.01); *B62J 25/00* (2013.01)

(58) Field of Classification Search
CPC .............. B62H 1/08; B62H 1/10; B62H 1/12; B62J 11/00; B62J 25/00; B62K 3/007
USPC ...................... 180/65.1, 21, 7.1, 218, 907, 13; 280/208, 78, 209, 205, 266, 282, 280/87.041
See application file for complete search history.

(56) References Cited

U.S. PATENT DOCUMENTS 5,701,965 A 12/1997 Kamen et al.
5,927,733 A * 7/1999 Banda ....................... 280/87.041
(Continued)

FOREIGN PATENT DOCUMENTS

DE 202006015937U1 Y 12/2006
EP 1695896 8/2006
(Continued)

*Primary Examiner* — Kevin Hurley
*Assistant Examiner* — Jacob Knutson
(74) *Attorney, Agent, or Firm* — Lucas & Mercanti, LLP; Klaus P. Stoffel

(57) ABSTRACT

A two-wheel battery-powered vehicle having a platform, two wheels connected to the platform, a battery-powered wheel drive driving the two wheels, an attachment connected to the platform, and a sensor device arranged in the platform. A person standing on the platform and engaging the attachment moves the platform into an angle position corresponding to a body position of the person. Based on the angle position of the platform relative to a horizontal position, the sensor device controls the wheel drive such that the wheel drive, by acceleration or deceleration, keeps the vehicle and the person standing on the platform in a balanced position. The attachment has a leg support device for at least one leg of the person standing on the platform in order to keep the platform at a desired angle position. The leg support device is adjustable.

18 Claims, 12 Drawing Sheets

(51) Int. Cl.
*B62J 11/00* (2006.01)
*B62J 25/00* (2006.01)

(56) References Cited

U.S. PATENT DOCUMENTS

| | | | |
|---|---|---|---|
| 5,971,091 A | 10/1999 | Kamen et al. | |
| 6,095,267 A * | 8/2000 | Goodman | 180/6.5 |
| 6,302,230 B1 | 10/2001 | Kamen et al. | |
| 6,367,817 B1 | 4/2002 | Kamen et al. | |
| 6,408,240 B1 | 6/2002 | Morrell et al. | |
| 6,561,294 B1 | 5/2003 | Kamen et al. | |
| 6,575,539 B2 | 6/2003 | Reich | |
| 6,581,714 B1 | 6/2003 | Kamen et al. | |
| 6,598,941 B2 | 7/2003 | Field et al. | |
| 6,601,869 B2 * | 8/2003 | Porcheron | 280/648 |
| 6,651,766 B2 | 11/2003 | Kamen et al. | |
| 6,659,208 B2 * | 12/2003 | Gaffney et al. | 180/19.2 |
| 6,779,621 B2 | 8/2004 | Kamen et al. | |
| 6,789,640 B1 | 9/2004 | Arling et al. | |
| 6,796,396 B2 | 9/2004 | Kamen et al. | |
| 6,799,649 B2 | 10/2004 | Kamen et al. | |
| 6,815,919 B2 | 11/2004 | Field et al. | |
| 6,827,163 B2 | 12/2004 | Amsbury et al. | |
| 7,303,032 B2 | 12/2007 | Kahlert et al. | |
| 7,303,132 B2 | 12/2007 | Knowles et al. | |
| 2006/0202439 A1 * | 9/2006 | Kahlert et al. | 280/47.24 |
| 2007/0084662 A1 | 4/2007 | Oikawa | |
| 2008/0209783 A1 | 9/2008 | Trainer | |

FOREIGN PATENT DOCUMENTS

| | | |
|---|---|---|
| JP | 2009120177 X | 6/2009 |
| WO | 2007100148 Y | 9/2007 |

* cited by examiner

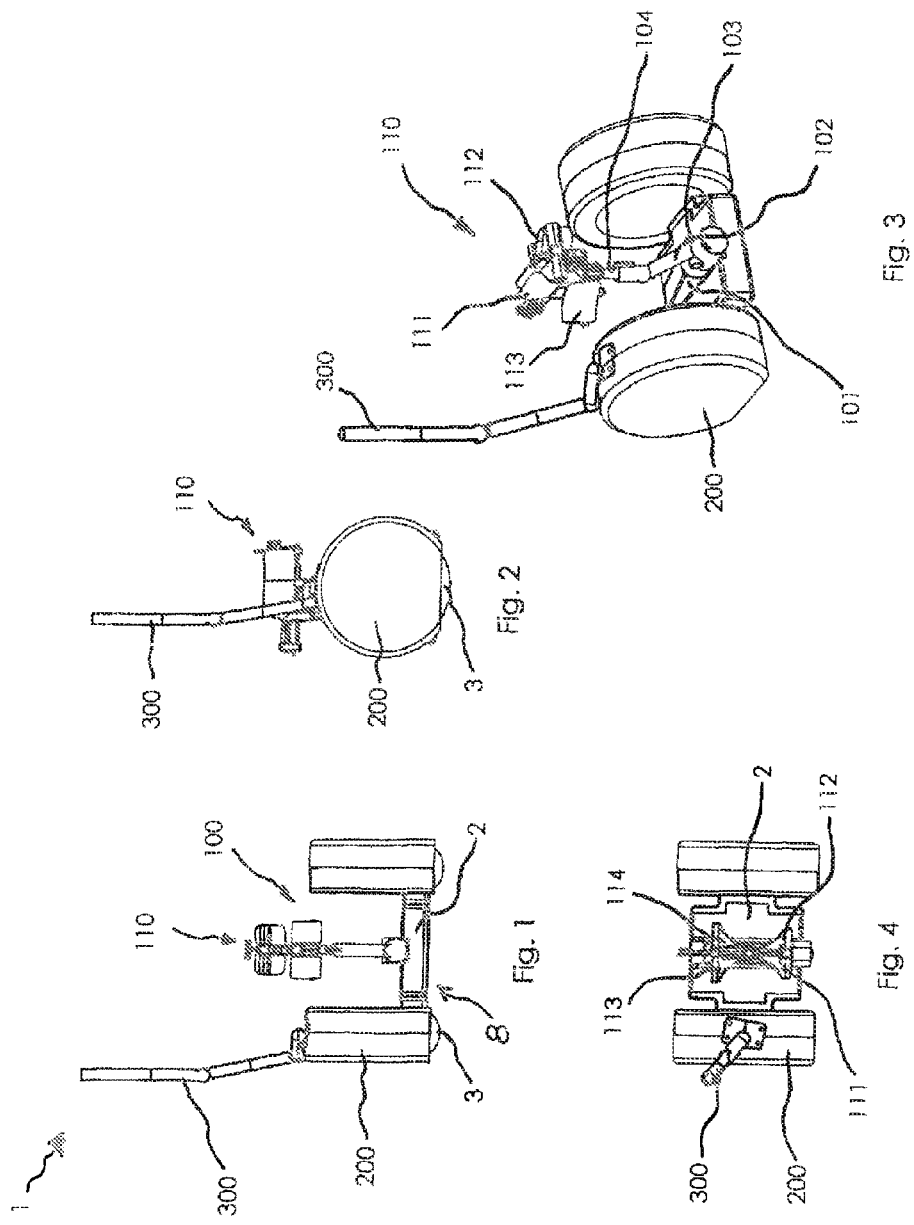

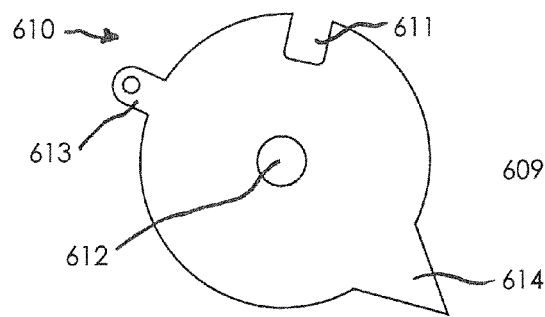
Fig. 27
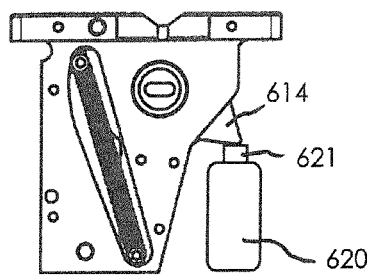 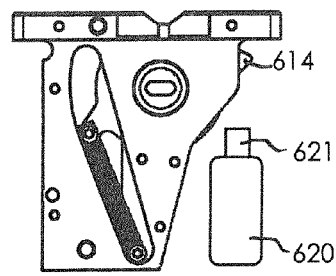
(a) (b)
Fig. 28
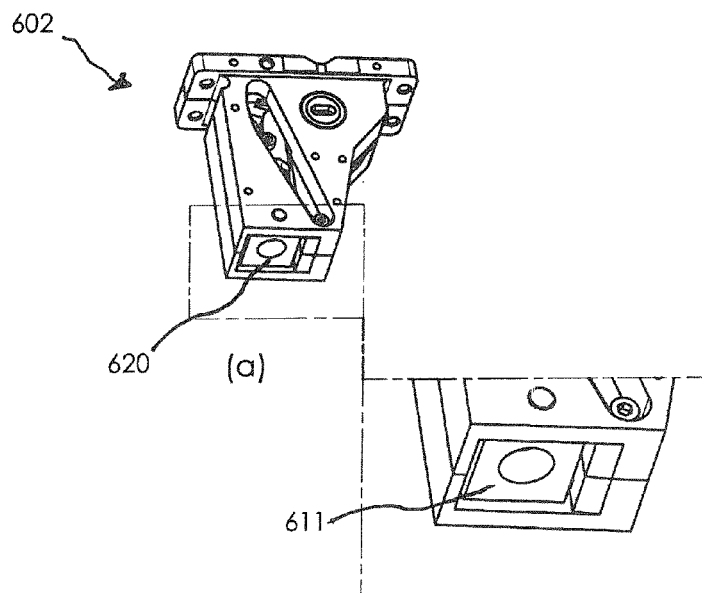
(a)
(b)
Fig. 29

TWO-WHEELED BATTERY-POWERED VEHICLE

The present application is a 371 of International application PCT/EP2012/056339, filed Apr. 5, 2012, which claims priority of EP 121 57 980.9, filed Mar. 2, 2012, and U.S. 61/471,888 filed Apr. 5, 2011, the priority of these applications is hereby claimed and these applications are incorporated herein by reference.

BACKGROUND OF THE INVENTION

The invention generally relates to a two-wheel battery-powered vehicle comprising a platform, two wheels connected to the platform, a battery-powered wheel drive driving the two wheels, an attachment connected to the platform, a sensor device arranged in the platform, wherein a person standing on the platform and engaging the attachment moves the platform into an angle position corresponding to a body position of the person, wherein, based on the angle position of the platform relative to a horizontal position, the sensor device controls the wheel drive such that the wheel drive, by acceleration or deceleration, keeps the vehicle and the person standing on the platform in a balanced position.

Such a vehicle is in use and known under the name "Segway®". The platform of this known vehicle comprises a flat box in which the battery, the sensors, and the control equipment are arranged. The standing surface is positioned at the comfortable height of a usual stair step. The person steps from the rear onto the platform and reaches for two handles that, similar to a bicycle handlebar, are arranged on a column arranged on the platform. In one embodiment of the vehicle, one side of the handlebar contains a rotary handle with which the control right/left steering is achieved. In another, right/left steering is achieved by leaning the entire handlebar to right and left. Speed control is achieved by a special type of balance control: The more the person and the column supporting the handles leans forward, the faster the vehicle moves forward. When leaning to the rear, the vehicle moves backwards, or decelerates. When the vehicle stands still and the person is not moving, the balance is maintained by acceleration and counter acceleration in which the vehicle moves continuously back and forth within small fractions of a second.

The "Segway®" vehicle is subject to U.S. Pat. Nos. 5,701,965; 5,971,091; 6,302,230; 6,367,817; 6,408,240; 6,561,294; 6,575,539; 6,581,714; 6,598,941; 6,651,766; 6,779,621; 6,789,640; 6,796396; 6,799,649; 6,815,919; and 6,827,163 which are incorporated herein by reference. While the "Segway®" vehicle provided simple transportation, controlling such a vehicle while carrying objects, especially while operating a camera, is not well supported.

EP 1695896 and U.S. Pat. No. 7,303,132 describe a further development of the two-wheel battery-powered vehicle. Instead of the handles of the "Segway®" vehicle, an attachment that has a leg support device for at least one leg of the person standing on the platform for keeping the platform at a desired angle position is connected to the platform. To drive the vehicle, the person standing on the platform leans his body forwards or backwards, thereby engaging the attachment and inclining the platform. Based on the angle of inclination of the platform, the sensor device controls the wheel drive such that, by acceleration or deceleration, the vehicle and the person standing on it are kept in a balanced position. A right/left control equipment providing foot pedals controls turning of the vehicle in a traveling direction by driving the wheels at different speeds. The vehicle requires that the person leans, tilts or otherwise compromises the body in order to maneuver the transport.

Furthermore the above mentioned patents disclose a bow-shaped support, which is provided for an object to be carried on the vehicle; the support is arranged to be pivotable to the front and to the rear of the vehicle, preferably on or near the wheel axle, and can be connected to the body, preferably by a bracket laterally engaging the body. The support that extends approximately to the waist of the person is provided as a hard mount of a camera.

While the developments disclosed in EP 1695896 and U.S. Pat. No. 7,303,132 improve the possibilities to use the two-wheel battery-powered vehicle, several shortfalls when operating remain. For example, the vehicle shows a leg-saddle comprising two concave control shells placed between a user's legs at a height above the knees. With this vehicle braking requires a person to incline the body rearwards from above the knees, in particular from above the hips, which leads to unnatural body positions.

Furthermore the vehicle is vulnerable to accidents and mishaps. A common accident occurs when one or both wheels of the vehicle run into an object too high for the vehicle to negotiate, e.g. a wall, kerb, leg, or any other obstacle. This often results in the vehicle attempting to climb the object, thus throwing the person off the machine, and causing the vehicle to perform an emergency shut down, whereby it looses power and falls over. A person that does not carry or operate any equipment may be injured, but a person who does may also be forced to abandon the equipment, causing damage to it or to people or objects in the vicinity.

SUMMARY OF THE INVENTION

Thus it is an object of the invention to facilitate the operation of the vehicle and to make the use of the vehicle safer.

This object is achieved in that the attachment has a leg support device for at least one leg of the person standing on the platform in order to keep the platform at a desired angle position.

In a particularly preferred embodiment of the invention, the leg support device is provided to lie on the lower leg of the person. Advantageously the person is able to bend his knees when operating the vehicle. For accelerating, the person can engage the machine by pushing forward with the leg. When decelerating, stopping, or going backwards, the person can transfer his weight back without bending his torso backwards, but by making a movement which is similar to a movement sequence that one conducts when sitting down on a chair. This allows the centre of gravity of the person to be moved backwards by a greater degree, causing greater deceleration.

Thus it is created a more ergonomic, versatile and safe control system to make possible a better body control and as a result better control of supported loads or tools.

In a particularly preferred embodiment of the invention the leg support device is provided to lie on the leg upon an area of a calf of the person. It rests comfortably on the bulk of the calf muscle, avoiding contact with the hamstring tendons. This position allows maximal braking potential, while optimizing comfort.

Expediently the leg support device provides separate shells for its front and its rear side and the front and the rear shell are arrangeable in differing heights.

In a further embodiment of the invention the shell of the front side is provided to sit on or above the knee of the person. Advantageously the person gains exact control of the acceleration or forward movement. Furthermore the person feels safe when accelerating by pushing his knees against the front shells.

In a further embodiment of the invention the, preferably cushioned, shells are curved or angled and preferably provide essentially the form of a quadrant so that they can comfortably sit on the persons leg. Preferably, the shells contact the leg laterally, preferably at an inner side of the leg.

Expediently the positions of the shells are adjustable independently of one other, preferably adjustable in a vertical and/or horizontal direction and/or pivotable about a vertical and/or a horizontal axis. The shells may be individually adjusted left and right along the coronal plane to accommodate differing distances between persons' legs, and may be rotated about the sagittal plane to accommodate differing musculature. Furthermore, the person can vary the distance between the front and rear shells. Tightening brings an increased contact with the shells necessary for negotiating uneven terrain, and has the benefit of encouraging the person into a slight crouching position, analogous to skiing, that allows the legs to function as natural shock absorbers and to adjust to changing levels of left and right wheels that might pitch an erect operator sideways from the vehicle.

Furthermore the leg support device may provide an equipment to adjust the position of the shells, so that equilibrium may be obtained even when supporting a heavy load supported to the front of the machine. Expediently the adjusting equipment comprises a spindle drive which preferably comprises a spindle whose threaded rod is provided with a rotating means, preferably a crank handle or a rotary knob.

In a particularly advantageous embodiment of the invention the leg support device is provided for swiveling around a vertical axis. When the person rotates his or her body to face into the direction of a turn, he may turn his hips and naturally rotate his knees to effect a tight swivel turn, the body initiating the movement from the ankle joints up. This natural way to control the vehicle enables new turning movements and encourages the person to move ergonomically on the vehicle. In contrast, when using the prior art leg-saddle which is rigid about the horizontal plane, the body rotates from the knee joint up only. This results in additional strain being placed on the knee joint, and a decrease in the person's ability to face into the direction of the turn.

Expediently the leg support device is provided with a spring which is arranged such that it is loaded when the leg support device is swiveled. Due to the force of the spring, the leg support device is placed in its centred position when the rotational force of the legs is taken off. Accordingly the leg support device is of a self-centering nature. Furthermore the shells provide a counterpressure for the swivel movement to the persons leg and thereby provide better control of the swiveling movement. Preferably the spring is arranged on a support rod of the leg support device which is connected to the platform.

An expedient embodiment of the invention is characterized by a replacement part comprising the leg support device. The replacement part is connectable to the base column of a commercially available vehicle of the aforementioned kind in place of the usual commercially provided height-adjustable column having handles.

The replacement part enables retrofitting of the vehicle but also an economic variation within the production.

In particular for retrofitting, for the right/left control of the vehicle it is proposed to provide two foot pedals; furthermore, the replacement part is provided with a rocker device that is provided with the foot pedals; by means of at least one arm projecting upwardly from the rocker device, an electric control member mounted on the replacement part is actuated for the control right/left. Preferably, the electric control member is a control member that is removed from the rotary handle of a commercially available attachment of the vehicle.

Moreover, the control member can be provided with a drive means cooperating with the arm, preferably a pin that is mounted on a rotary disk that engages a slotted hole or a bifurcation of the arm.

When the vehicle is produced from the start in accordance with the present invention, the control right/left will be realized preferably in a different way, for example, by pressure switches or by means of sensors in the platform that react to weight shifting from one foot to the other.

In a further embodiment of the invention which may be used as alternative or additionally to the described right/left control the mentioned sensor device is provided for determining the swiveling angle of the leg support device in relation to the platform, wherein the sensor device controls the driving direction of the vehicle by turning the wheels at different speeds based on the determined swiveling angle. The person can control steering of the machine by rotating his body towards the intended direction to initiate steering.

Alternatively or additionally the leg support device, preferably the attachment as a whole, may be tiltable in relation to the platform and the sensor device controls the driving direction of the vehicle by turning the wheels at different speeds based on the determined tilting angle. Driving direction of the vehicle can be controlled by leaning the body towards the intended direction to initiate steering.

In a further embodiment of the invention, the vehicle comprises a for each wheel a fender which partially encloses the wheel, wherein it preferably fully encloses at least the upper half of the wheel. The fender protects the person and the transported equipment against dirt which may be swirled up by the wheels. Furthermore it secures against unintended contact with environmental surroundings. In particular it prevents that clothes, e.g. long skirts or costumes that may be worn by actors using the vehicle in entertainment shows, from getting caught up in the wheels or the gears of the vehicle.

In a preferred embodiment of the invention the fender encloses the wheels to a height off the ground which corresponds to the height that the vehicle can climb. This height normally corresponds to approximately ¼ of the wheel diameter but a climb up to ⅓ of the wheel diameter, as the case may be up to ⅘, may be possible. When the vehicle comes into frontal contact with an object exceeding this height, the vehicle pushes it aside, or if the object is immovable, comes to rest against it. When the vehicle comes into glancing contact with an object, the blow deflects either the vehicle or the object. All these outcomes are preferable to the behavior of the known vehicle that attempts to climb any object it comes into contact with if it can obtain traction. This generally results in the vehicle performing an immediate emergency shut down and/or energetically ejecting the rider.

Expediently the fender comes down to different heights on the front and on its rear side. As the vehicle may safely descend a greater height that it may climb the fender systems may have a higher cut-off to the rear than to the front, allowing the vehicle to descend kerbs and drops. A rounded form of the rear cut-off helps to prevent the fender from hanging-up on a surface the vehicle is descending from.

In a further embodiment of the invention the fender is provided for being directly connected to the chassis, in particular to a gear box, of the vehicle. Preferably it comprises an attachment flange that is provided for being fixed onto fixing means of the gear box of the commercially available vehicle.

Thereto the flange comprises mounting holes that fit with tapped holes of the chassis or gear box so that the flange can be bolted down onto it.

Furthermore the fender may solely present rounded contours at its outside so that it presents less danger to people and objects in the vicinity of the vehicle than sharp edges of the known vehicle.

In a particularly preferred embodiment of the invention the fender is provided for carrying a support for an object to be transported, in particular a "hard-mount" to support any tool, load, or supported equipment, e.g. a camera. In the art, the term "hard-mount" refers to a system of supporting equipment that does not use the physical strength of a person operating the equipment. Expediently the support comprises an articulated bracket and preferably is provided to be pivotable to the front and the rear of the vehicle.

Though the fenders may be made of a single piece, in a preferred embodiment of the invention it is made of two half-shells, wherein preferably an inner half-shell is connected to the gear box and an outer half-shell encloses the wheel's outer side.

The inner half-shell may be provided to solely carry the mentioned object support. Preferably it is made of a material, e.g. steel or aluminium, providing sufficient strength to bear the object support carrying the object.

Expediently the outer half-shell can be manufactured in a variety of sizes to fit different wheels. It may be made of a less heavy material, e.g. a plastic material that is malleable and therefore less like to cause damage to people or surroundings.

In a further development of the invention the vehicle comprises means for automatically stabilizing the vehicle against falling over forward or backward in case of a vehicle cut-off in order to maintain the vehicle in its erect orientation when it has shut down. During any instance of the vehicle's loosing power, either by malfunction or initiated by the person, these supports may be rapidly deployed to prevent the transporter from falling over.

Preferably the stabilizing means comprises at least one extendible support wheel on the front side and at least one on the rear side of the vehicle. It descends to project below and away from the chassis of the vehicle to make contact with the ground at angles suitable to stabilizing the transporter when it is not under power.

In a preferred embodiment of the invention the support wheels are arranged on a telescopic rod which is provided with a spring, in particular a gas spring or a helical spring, by force of which the telescopic rod can be extended.

In a further development of the invention the vehicle comprises a means to manually shut down the power supply of the vehicle when the person is aboard. When carrying or operating equipment it may be desirable to shut off power to the vehicle in conjunction with the above-mentioned stabilizers. The shut down means operates by directly cutting power between the power supply and the motor and control systems of the vehicle by means of an electrical switch.

In a preferred embodiment the shut down means comprises power supply connector plug which is extensible out of a connector holder that preferably is arranged on the upper side of the vehicle so that the vehicle can be shut down by pulling the connector plug upwards out of the connector holder and thereby to operate the electrical switch.

Expediently the connector plug and the connector holder are provided such that the connector plug is extensible out of the connector holder in a vertical direction and in angles up to at least 15°, preferably up to at least 30°, to the vertical axis of the vehicle. For easy use during driving the vehicle, the connector plug may comprise a control rope which is provided to be hold in a hand of the person.

It is a matter of course that the leg support device, the fender, the stabilizers and the shut down means may be provided independently of each other and each in itself beneficial for the vehicle.

Furthermore the fender, the stabilizers and/or the shut down means may also be applied to any known embodiment of prior art vehicles, e.g. "Segway®", which may comprise the above mentioned two handles instead of the leg support device, or other two-wheel battery-powered vehicles.

These and other objects and advantages will be made apparent when considering the following detailed specification when taken in conjunction with the drawings.

BRIEF DESCRIPTION OF THE DRAWING

FIG. 1 shows a front view of a vehicle according to the invention,

FIG. 2 shows a side view of the vehicle according to FIG. 1,

FIG. 3 shows a perspective view of the vehicle according to FIG. 1,

FIG. 4 shows a top view of the vehicle according to FIG. 1,

FIG. 27 shows a lateral view of a detail of the component part according to FIGS. 23-26, FIG. 28 shows a lateral view of the component part according to FIG. 23 in different functional positions, FIG. 29 shows another perspective view of a component part of the vehicle according to FIG. 19.

DETAILED DESCRIPTION OF THE INVENTION

Figures 5, 6:
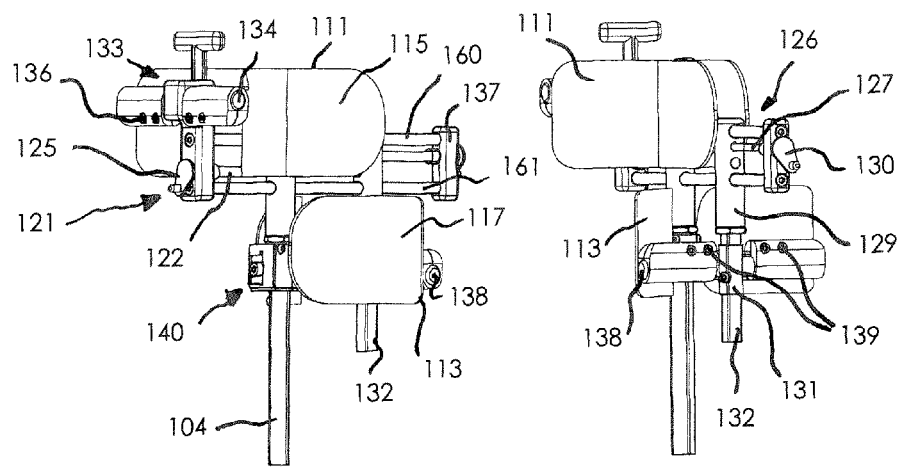
FIG. 5 shows a perspective view of a detail of the vehicle according to FIG. 1.
FIG. 6 shows another perspective view of a detail of the vehicle according to FIG. 1.
Figures 7, 8:
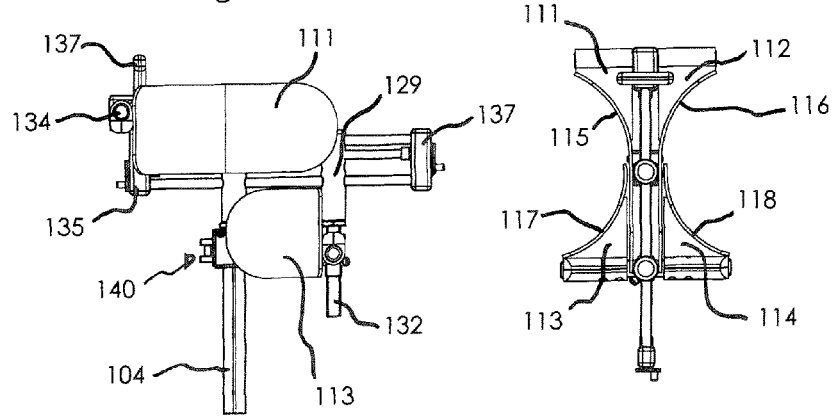
FIG. 7 shows a side view of a detail the vehicle according to FIG. 1.
FIG. 8 shows a top view of a detail the vehicle according to FIG. 1.

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

Any and all the above references and U.S. patents and applications are incorporated herein by reference. Aspects of the invention can be modified, if necessary, to employ the systems, functions and concepts of the various patents and applications described above to provide yet further embodiments of the invention.

FIGS. 1-4 show a vehicle 1 according to the present invention which provides a platform 2 configured as a flat box, two wheels 3 connected to the platform 2 and enfolded by fenders 200, a battery-powered wheel drive 8 driving the two wheels 3, an attachment 100 connected to the platform 2 and a sensor device arranged in the platform 2. On one of the fenders 200 is mounted a support 300 for an object to be transported.

The attachment 100 at the front end of the vehicle 1 extends upwardly from the platform 2. It is comprised of a rigid base support 101 fixedly connected to the platform 2 and a support column 102 which is positioned with a socket 103 to the base support 101. The support column 102 extends at a slant upwardly and is connected to a support rod 104 of a leg support device 110 comprising front shells 111,112 and rear shells 113,114. The front and rear shells 111-114 are provided with lay-on surfaces 115-118 for the legs of a person which provide approximately the form of a quadrant. As it can be seen in FIGS. 1 and 3 the front shells 111,112 are arranged in a higher position than the rear shells 113,114.

Figures 9, 10:
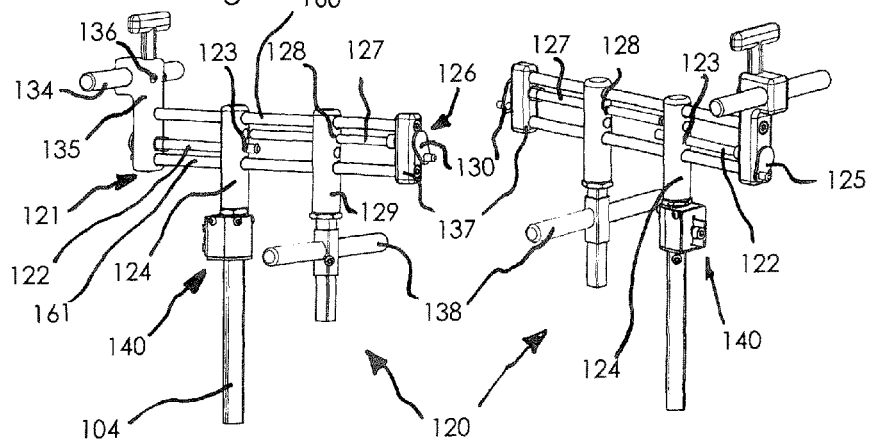
FIG. 9 shows a perspective view of a detail of the vehicle according to FIG. 1.
FIG. 10 shows another perspective view of a detail of the vehicle according to FIG. 1.

As presented in FIGS. 5-10, the leg support device 110 comprises an adjustable rod system 120 carrying the shells 111-114. FIGS. 9 and 10 show the rod system 120 with the front and rear shells 111-114 removed.

The rod system 120 comprises a middle support rod 124 which is connected to the support rod 104, a front support member 133 carrying the front shells 111,112, a further middle support rod 129 connected to the rear shells 113,114, and a rear adjustment member 137. The middle support rod 124, the front support member 133, the middle support rod 129, and the rear adjustment member 137 are connected with each other by sliding rods 160,161.

The leg support 110 as a whole is height-adjustable by moving and subsequently fixing the rod system 120 along the rigid base column 104. The rear shells 113,114 are mounted on a rear support member 131 which is arranged slidable on a support bar 132 in order to adjust the height of the rear shells 113,114 in respect to the front shells 111,112.

The front shells 111,112 are mounted on the front support member 133 which comprises a horizontal bar 134 and a support block 135. Together with the further middle support block 129 and the rear adjustment member 137 the front support member 133 is horizontally adjustable by means of a spindle drive 121 comprising a threaded rod 122. The threaded rod 122 is fed through a tapped bore 123 of middle support rod 124 and provided with a crank handle 125.

Analogously a spindle drive 126 with a threaded rod 127, a tapped bore 128 of the further middle support rod 129 and a crank handle 130 is provided for the rear support member 131 in order to adjust the rear support member's horizontal position in respect to the front support member 133.

While the transverse horizontal space between the respective left and right shells 111-114 is adjustable to comport to variations in space between different person's legs, the position of the leg support device 110 as a whole is adjustable to move the person's 400 center of gravity which may include camera gear forwards and backwards to achieve equilibrium in the stopped position. The position may be adjusted by use of the spindle drives 121,126 and the handle 125,130 which may be adjusted while in use.

The front shells 111,112 are fixed on the horizontal bar 134 which is arranged pivotable around a horizontal axis in a support bore of a carrier block 135. The position of the horizontal bar 134 can be fixed with bolts 136 which are arranged in threaded bores that lead to the support bore.

The position of the front shells 111,112 can individually be adjusted against each other by loosening bolts 136, pivoting the front shells 111,112 around the horizontal bar 133 and/or move them along it and fixing the bolts 136 again.

In the same manner the position of the rear shells 113,114 can be adjusted by loosening and bolts 139, pivoting/moving the rear shells 113,114 around/along a horizontal bar 138 of the rear support member 131, and subsequently fixing the bolts 139 again.

The front and rear shells 111-114 may be rotated about the transverse horizontal axis of the horizontal bars 133,138 to accommodate persons of varying bone structure and muscular development. Thus the disclosed leg support device 110 can accommodate persons presenting differing leg angles in both the vertical and horizontal axis.

Figure 12:
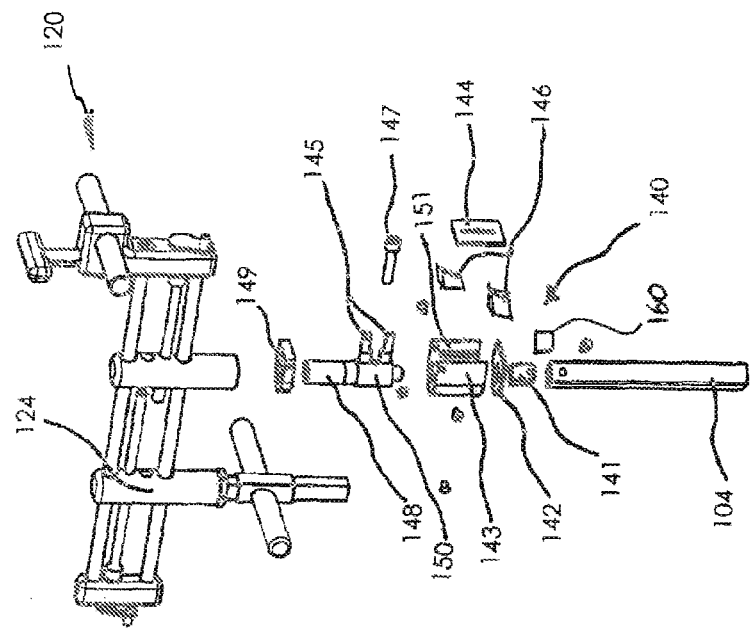
FIG. 12 shows an exploded perspective view of a detail of the vehicle according to FIG. 1.
Figure 11:
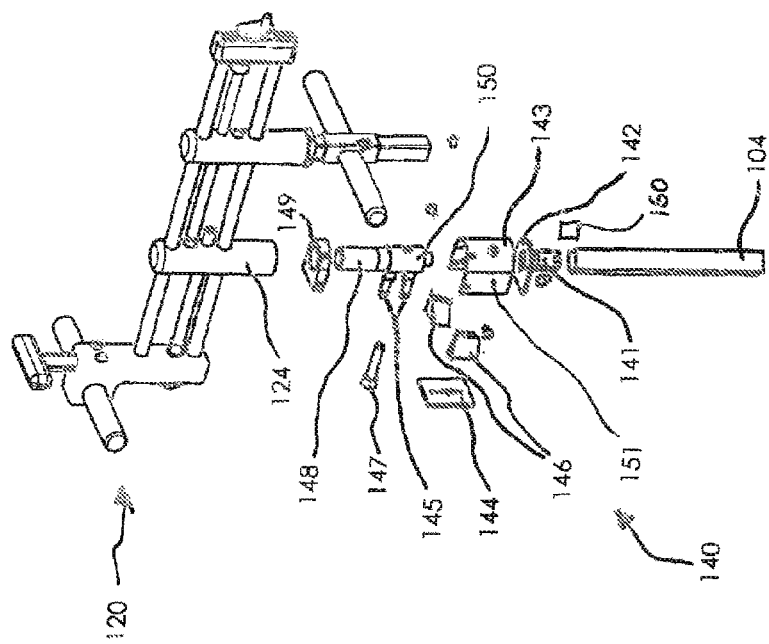
FIG. 11 shows an exploded perspective view of a detail of the vehicle according to FIG. 1.

As FIGS. 11 and 12 show detailed in exploded perspective views, the leg support device 110 is mounted on a swivel assembly 140 which connects the support rod 104 and the leg support device 110. The leg support 110 device can be pivoted around the longitudinal axis of the support rod 104 by means of the swivel assembly 140.

The swivel assembly 140 comprises a spring compartment which is made of a base plate 142 firmly fixed on the support rod 104, an U-shaped sidewall member 143 and a clamp 149 that sits on the sidewall member 143. The base plate 142 is connected to the support rod 104 by means of plug connection comprising a connecting bar 141 which fits into the support rod 104 and a cut-out of the base plate 142. While a superior part of a rotary bar 148 is arranged within the middle carrier rod 124 of the leg support device 110, a lower part sits in the spring compartment. A wedge 150 with two perpendicularly protruding pins 145 is arranged on the lower part of the rotary bar 148. On each lateral side of the pins 145, i.e. between the pins 145 and even parts 151 of the U-shaped sidewall member 143, a resilient silicone pad 146 acting like a spring is arranged. On the front side of the spring compartment, a spring load adjusting plate 144 that is provided with a recess is arranged. The closing plate 144 is fastened to rotary bar 148 by an adjusting bolt 147 that presses the adjusting plate 144 against the silicone pads 146.

The leg support device 110 can be swiveled against the force that is necessary to deform the silicone pads 146. When the force is taken off, the silicone pads 146 push the leg support device 110 back in a centred position.

The spring load provided by the silicone pads 146 can be adjusted with the aid of the adjusting bolt 147. If the adjusting bolt 147 is tightened strongly the adjusting plate 144 presses on the silicone pads 146. As a result the silicone pads 146 are compacted in the spring compartment and a greater force is necessary to deform them. Accordingly the leg support device 110 exerts more counterpressure against the legs of the person when his legs abut against the front or the rear shells 111-114. Correspondingly, if the adjusting bolt 147 sits only loosely on the closing plate 144, swiveling the leg support device 110 is easier.

Figure 13:
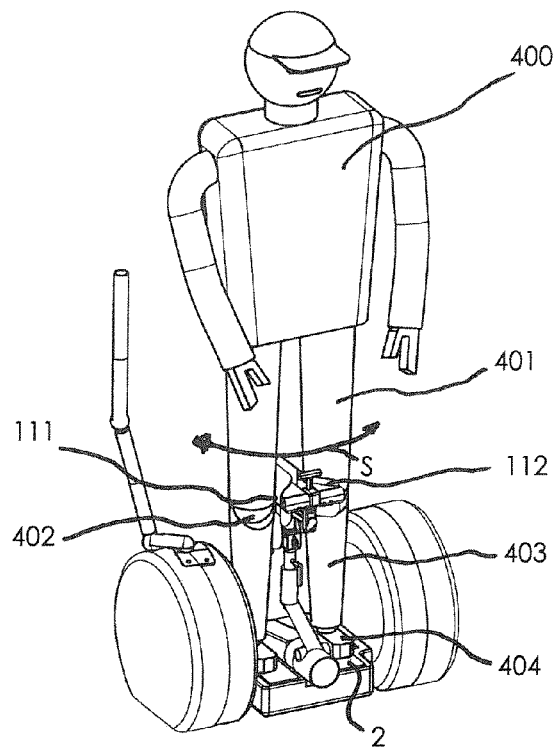
FIG. 13 shows a perspective view of the vehicle according to FIG. 1 when used by a person.

Referring to FIG. 13, the vehicle 1 is shown when used by a person 400. The person 400 stands with his feet 404 on the platform 2 and his legs 401 lay on the lay-on surfaces 115-118 of the shells 111-114.

Figure 14:
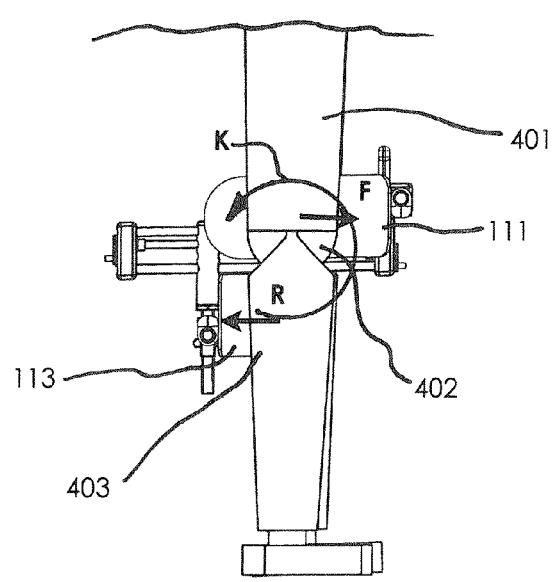
FIG. 14 shows a perspective view of a detail of the vehicle according to FIG. 1 when used by a person.

As it is shown more detailed in FIG. 14 which shows a section of the leg support device 110 and one of the legs 401 of the person 400 when standing on the vehicle 1 the front shells 111,112 lay above and on the knees 402 on the fore side of the legs 401 and the rear shells 113,114 lay on the person's 400 calfs 403.

Figure 33:
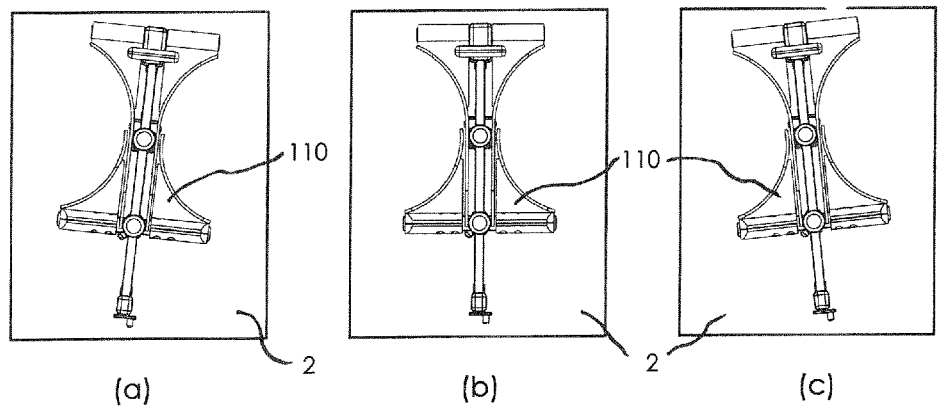

As it is illustrated in FIG. 14, when accelerating the vehicle 1 the person 400 can lean forward and thereby abut his knees 402 and/or his upper legs 401 against the front shells 111,112 (see arrow F). To decelerate or tho reverse he can lean backwards by bending his knees 402 (see arrow K) and moving into a sitting position wherein calfs 403 back against the rear shells 113,114 (see arrow R). When the person 400 wants to turn the vehicle and thereto twists his upper body in the turning direction the leg support device 110 follows the corresponding movement of person's legs and swivels by means of the swivel assembly 140 (see arrow S on FIG. 13). FIG. 33 shows in a top view the positions of the leg support device 110 in relation to the platform when it is swiveled to the right (FIG. 33 (a)) or to the left side (FIG. 33 (b)). When swiveling the leg support device 110, the rotary bar 148 pivots about its longitudinal axis and the pins 145 are pressed against the resilient silicone pads 146. Once no swiveling force acts on the leg support device 110, the silicone pads 146 push it back into a centred position.

The swivel assembly 140 may comprise sensor equipment 160 for detecting the swivel angle of the leg support device 110 in relation to the support rod 104 or/and the platform 2. The sensor equipment 160 is arranged in the support rod 104 and measures the degree of rotation of the rotary bar 148 in relation to the support rod 104 or the spring compartment. It is connected to the sensor device so that the determined degree of rotation can be used as steering information for the right/left control of the vehicle. The driving direction of the vehicle 1 can be controlled in function of the swivel angle by driving the wheels at different speeds so that the person 400 can steer the vehicle by pivoting the leg support device 110.

Figure 34:
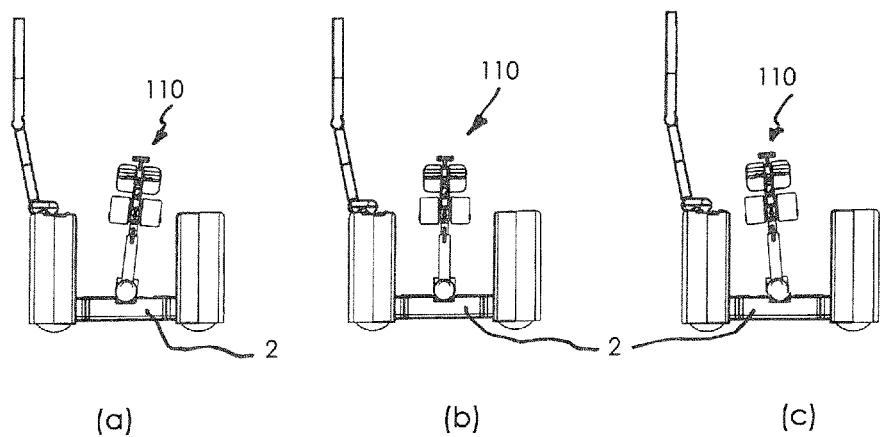
FIG. 34 shows different functional positions of a vehicle according to the invention in front views.

Another possibility is to arrange the attachment 100 as a whole such that it is tiltable on the platform wherein the attachment is self-centering by force of a spring. If the vehicle comprises a sensor equipment for detecting tilting angle of the attachment 100 in relation to the platform 2, the person 400 can control the driving direction of the vehicle by leaning his body to the left or to the right and thereby pushing the attachment in the corresponding direction. Right/left tilting positions of the attachment 100 are shown in FIG. 34 (a) and (b).

Furthermore the sensor equipment for detecting the swivel angle of the leg support device and the sensor equipment for detecting tilting angle of the attachment 100 can be combined so that the person can steer the vehicle by tilting as well as by swiveling.

Figure 15:
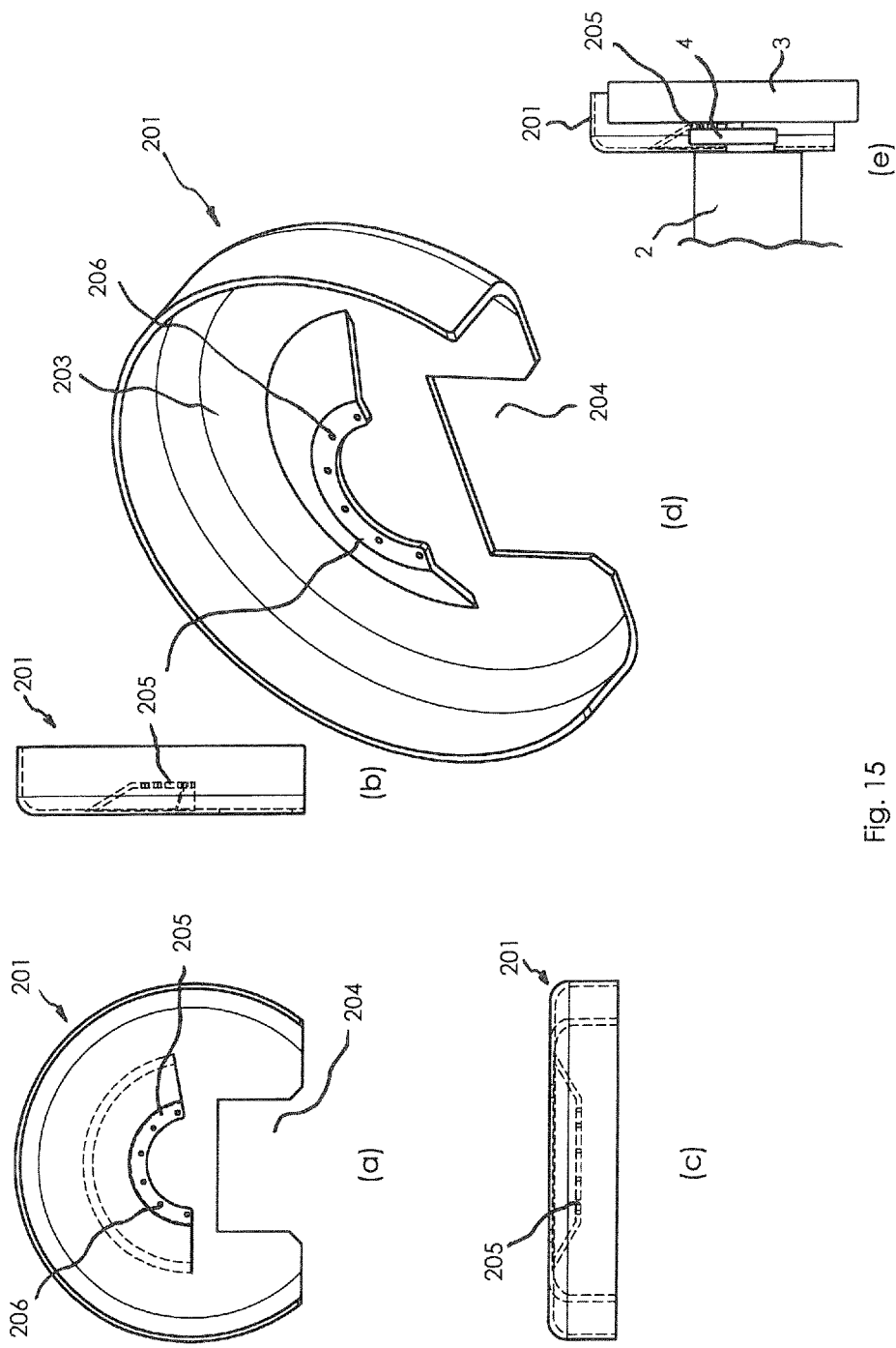
FIG. 15 shows a part of a fender according to the invention in different views.

As it can be seen in FIGS. 1 to 4, the fenders 200 are made of two half-shells 201,202. FIG. 15 shows in different views the inner half shell 201 which may be made of steel in order to be able to withstand heavy loads. On its closed side 203 it has a rectangular cut-out 204 with which it overlaps the platform 2. A semi-toroidal flange 205 is connected to the inner side of the half shell 201. As presented in FIG. 15 (e) the flange 205 is provided to sit over and partially enclose a part of the gear box 4 connecting the wheels 3 and is fixed on the gear 4 box by means of bolts that are led through bores 206. The bores 206 are arranged such that they fit with threaded bores that are provided on the gear box 4 of a commercially available vehicle ("Segway®"). The gear box 4 is part of the battery-powered wheel drive 8.

Figures 16, 17:
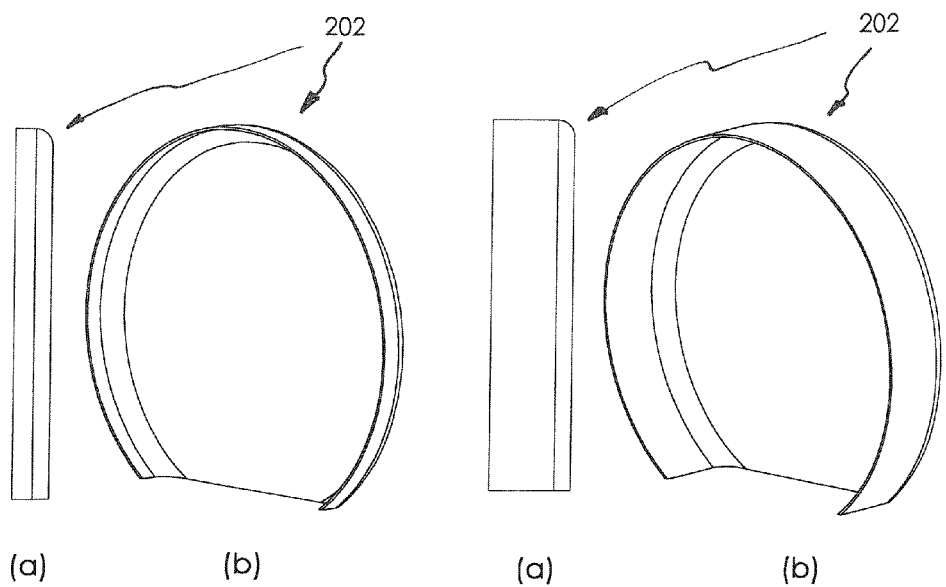
FIG. 16 shows another part of a fender according to the invention in different views.
FIG. 17 shows another part of a fender according to the invention in different views.

FIGS. 16 and 17 show slimmer and broader embodiments of the outer fender half-shells 202 which may be chosen in function of the wheel's 3 size.

The outside of the fenders 200 present solely rounded contours with no sharp edges, so that it offers less possibility of injuring or causing damage to any person or object the vehicle 1 may come into collision with.

Figure 32:
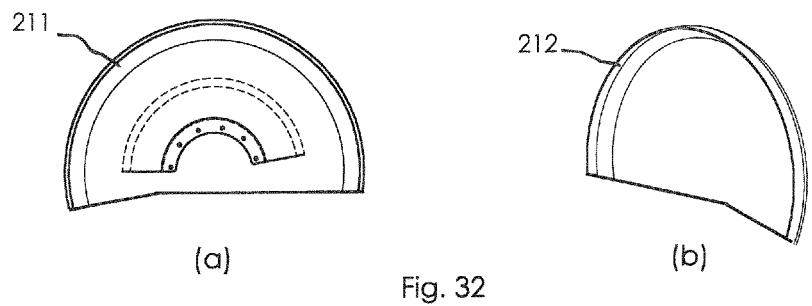
FIG. 32 shows a part of another fender according to the invention in different views, FIG. 33 schematically shows different functional positions of a vehicle according to the invention in top views.

As shown in FIG. 32 fender half shells 211,212 can be provided such that they enclose the wheels 3 to a smaller degree than the fenders 200 shown in FIGS. 1-4.

On the front side 213 the fenders 210 fully enclose the wheels 3 to a height off the ground that is consistent with the vehicles 1 climbing and descending capabilities. At their front ends, the fenders 210 descend to a height above the ground approximately equal to that of the height above the ground of the lower casing of a battery enclosure. This corresponds to the height that the vehicle 1 can safely climb. When the vehicle 1 comes into frontal contact with an object exceeding this height, the vehicle pushes it aside, or if the object is immovable, comes to rest against it.

On their rear side 214 the fenders 210 fully enclose the wheels 3 to a height off the ground such that it can descend a greater height that it may climb, allowing the vehicle to descend kerbs and drops. Furthermore a rounded nature of the fenders 210 helps to prevent them from hanging-up on a surface the vehicle 1 is descending from.

Figure 18:
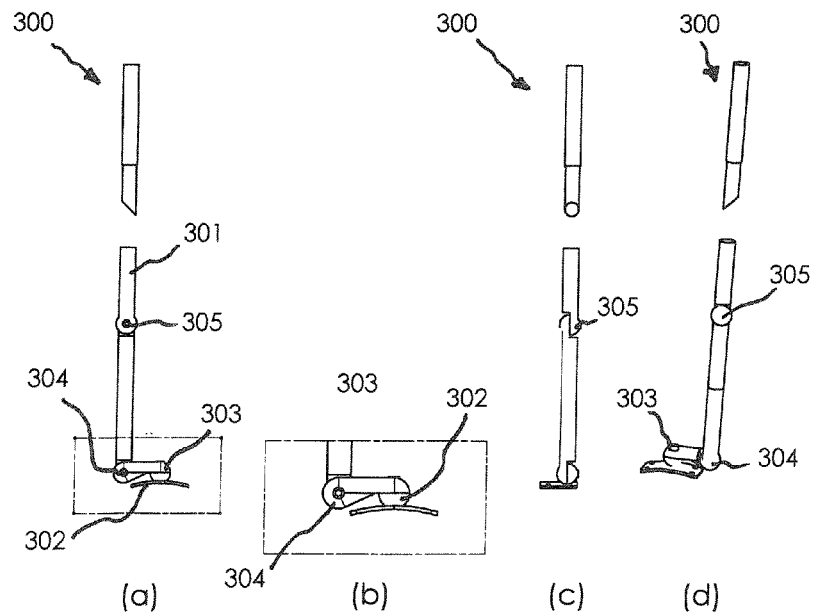
FIG. 18 shows an arm of an object support according to the invention in different views.

FIGS. 1 to 4 show how a hard-mount assembly 300 that may be attached to the fenders 200. The hard-mount assembly 300 comprises an articulated arm 301 which is fixed onto the fender 200 by means of a metal mount 302. As it is shown more detailed in FIG. 18 the hard-mount assembly 300 has three rotary joints 303-306 which allow exact adjustment of the arm 301.

Though the metal mount 302 of the vehicle 1 as shown in FIGS. 1 to 4 sits on the inner 201 as well as on the outer fender half shell 202, in particular for supporting heavy payloads it may be advantageous to mount it only on the inner half shell 201 that is made of steel, is connected directly to the gear box and is provided to carry heavy payloads.

Figures 19, 20:
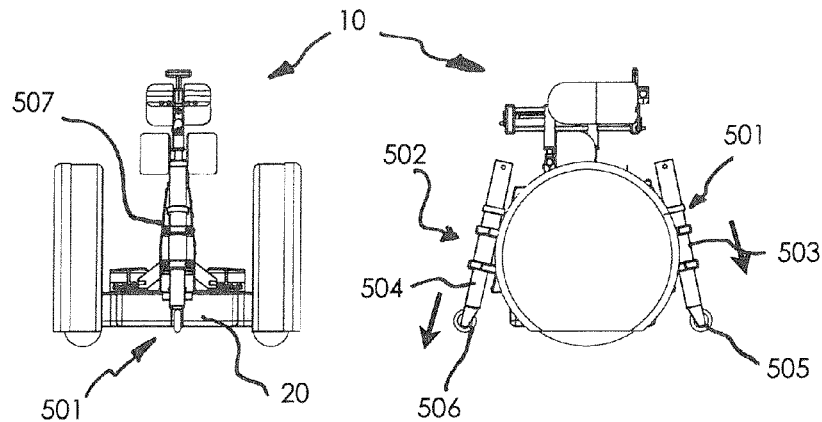
FIG. 19 shows a front view of another vehicle according to the invention.
FIG. 20 shows a side view of the vehicle according to FIG. 19.
Figure 21:
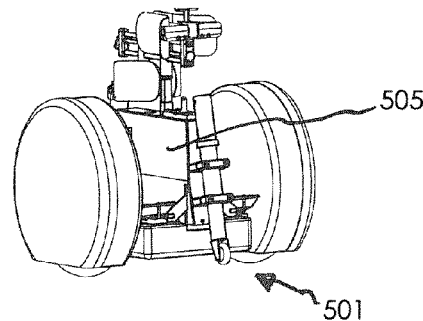
FIG. 21 shows a perspective view of the vehicle according to FIG. 19.

A further embodiment of the inventive vehicle is shown in FIGS. 19-21. The vehicle 10 differs form the vehicle 1 outlined above in that it is provided with stabilizers 501, 502 on its front and its rear side. Each stabilizer 501,502 comprises a telescopic rod 503,504 which is mounted to a chassis 505 that vertically protrudes form the platform 20 of the vehicle 10. Support wheels 505, 506 are arranged on ends of each of the telescopic rods 503,504. The telescopic rods 503,504 are provided with a gas spring 510. As presented in FIG. 35 one part 511 of gas spring 510 is connected to an upper rod 507 of the telescopic rods 503,504 and a movable part 512 of the gas spring 510 is fixed to a lower rod 508 of the telescopic rods 503,504. When activated the gas spring 510 extends the telescopic rods 503,504 to make contact with the ground at angles suitable to stabilizing the vehicle 10. The gas spring is automatically activated when the vehicle's 10 power supply is shut down. Then the stabilizers 501,502 maintain it in its erect position.

It is a matter of course that, alternatively, the telescopic rods 503,504 could be provided with helical springs for pulling them out.

Figure 22:
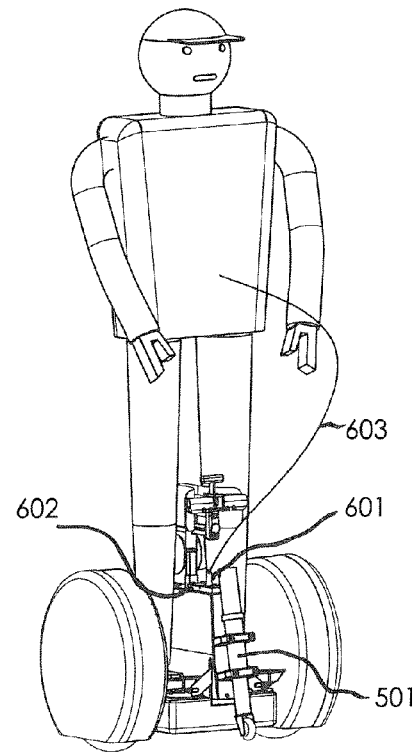
FIG. 22 shows a perspective view of another vehicle according to the invention when used by a person.

As it is shown in FIG. 22 the inventive vehicle 10 can be provided with a shut down means to manually shut down the power supply of the vehicle 10 when the person 400 is aboard. The shut down means comprises power supply connector plug 601 which can be extended out of a connector holder 602 that is arranged on the upper side of the chassis 505. Thereto the connector plug 601 is provided with a rope 603 which the person 400 driving the vehicle 10 holds in one of its hands.

When the person 400 pulls the connector plug 601 out of the connector plug 601 the power supply of the vehicle 10 is interrupted, the stabilizers 501,502 extend and the vehicle 10 stops.

Figure 30:
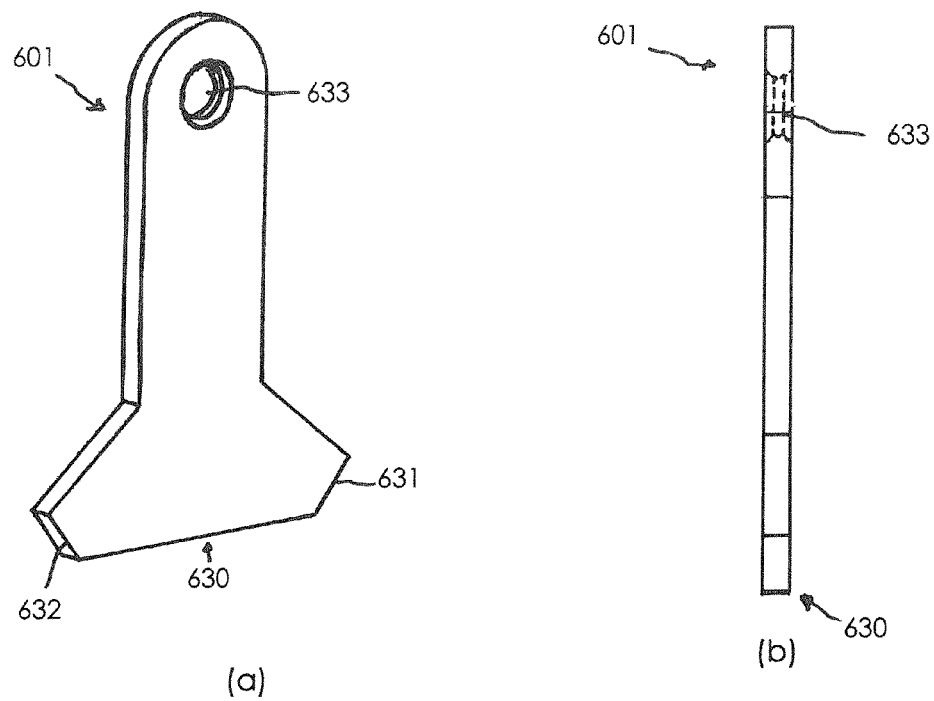
FIG. 30 shows a perspective and a lateral view of an element of the vehicle according to FIG. 19.
Figure 31:
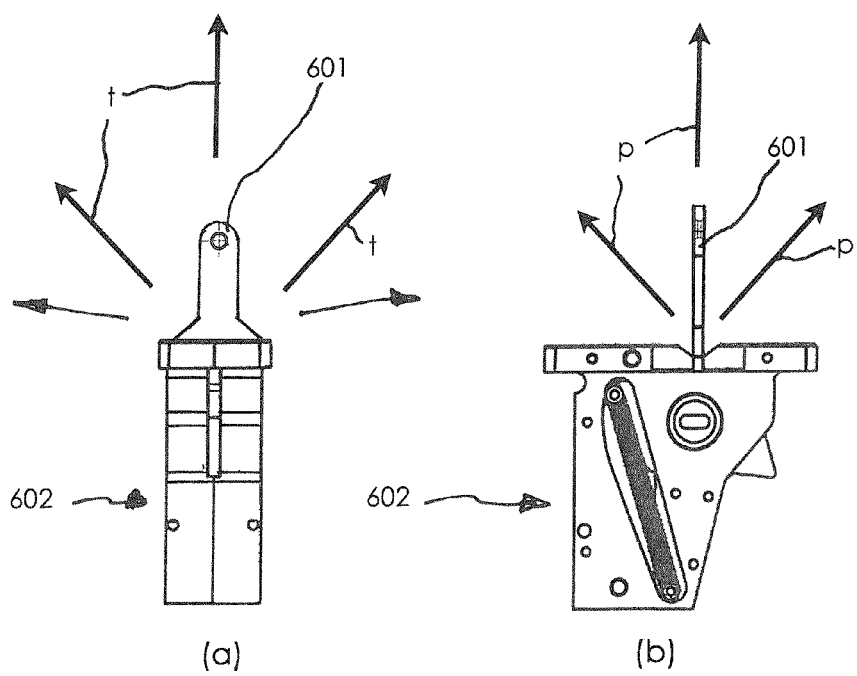
FIG. 31 shows lateral views of the component part according to FIGS. 23-29 and the element of the vehicle according to FIG. 30.

Component parts of the connector holder 602 are shown more detailed in FIGS. 23-29 and in FIG. 31. FIGS. 30 and 31 show the connector plug 601.

As presented in FIGS. 23-26 a casing of the connector holder 602 is provided with a reception recess 604 for the connector plug 601. The connector holder 602 comprises a rotary switch element 610 (FIG. 27) that is provided with an outer recess 611, a central aperture 612, a connecting tab 613 and a contacting tab 614. The central aperture 612 of the switch element 610 is arranged on an axle pin which forms the axis of rotation of the switch element 610. The axle pin is provided with a pin head 606 which can be engaged with a corresponding tool. The connecting tab 613 is connected to a spring 607 that is fixed to the casing.

Figure 23:
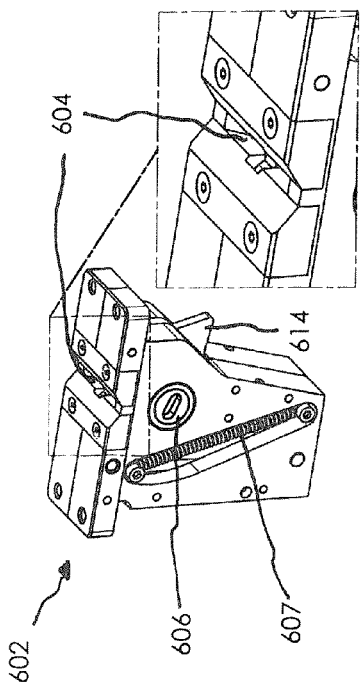
FIG. 23 shows a perspective view of a component part of the vehicle according to FIG. 19.
Figure 24:
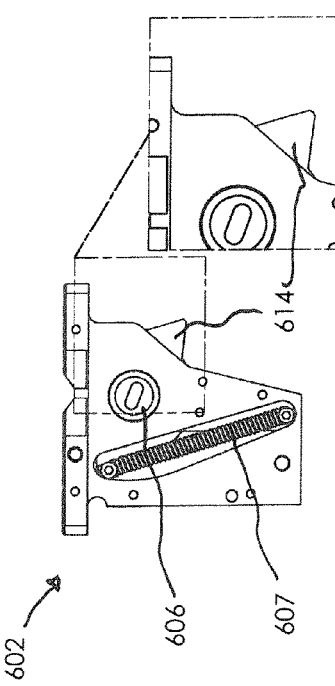
FIG. 24 shows the component part according to FIG. 23 in a lateral view.
Figure 25:
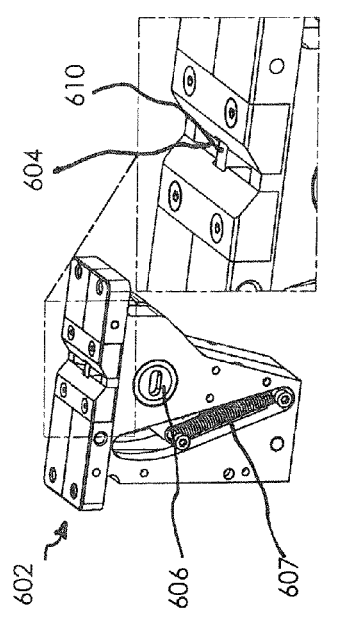
FIG. 25 shows a perspective view of the component part according to FIG. 23 in another functional position.
Figure 26:
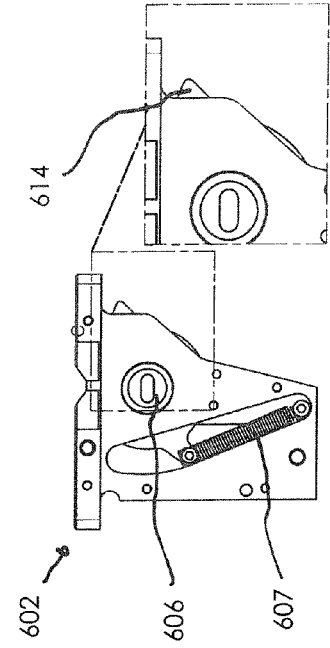
FIG. 26 shows a lateral view of the component part according to FIG. 23 in another functional position.

Using the tool the switch element 610 can be rotated against the force of the spring 607 such that the outer recess 611 is aligned with the reception recess 604 as shown in FIGS. 23 and 24 and the connector plug 601 can be put into the reception recess 604. As presented in FIG. 28 (a), in this position the contacting tab 614 holds a button 621 of an electrical switch 620 of the power supply of the vehicle in a switch-on position in which the vehicle is supplied with electrical energy. As soon as the connector plug 602 is pulled out of the reception recess 604, the spring 607 contracts and thereby turns the switch element 610 so that the contacting tab 614 turns in the position shown in FIGS. 25 and 26. The contacting tab 614 releases the button 621 and the electrical switch 620 gets in a switch-off position in which the power supply of the vehicle is interrupted.

Figure 35:
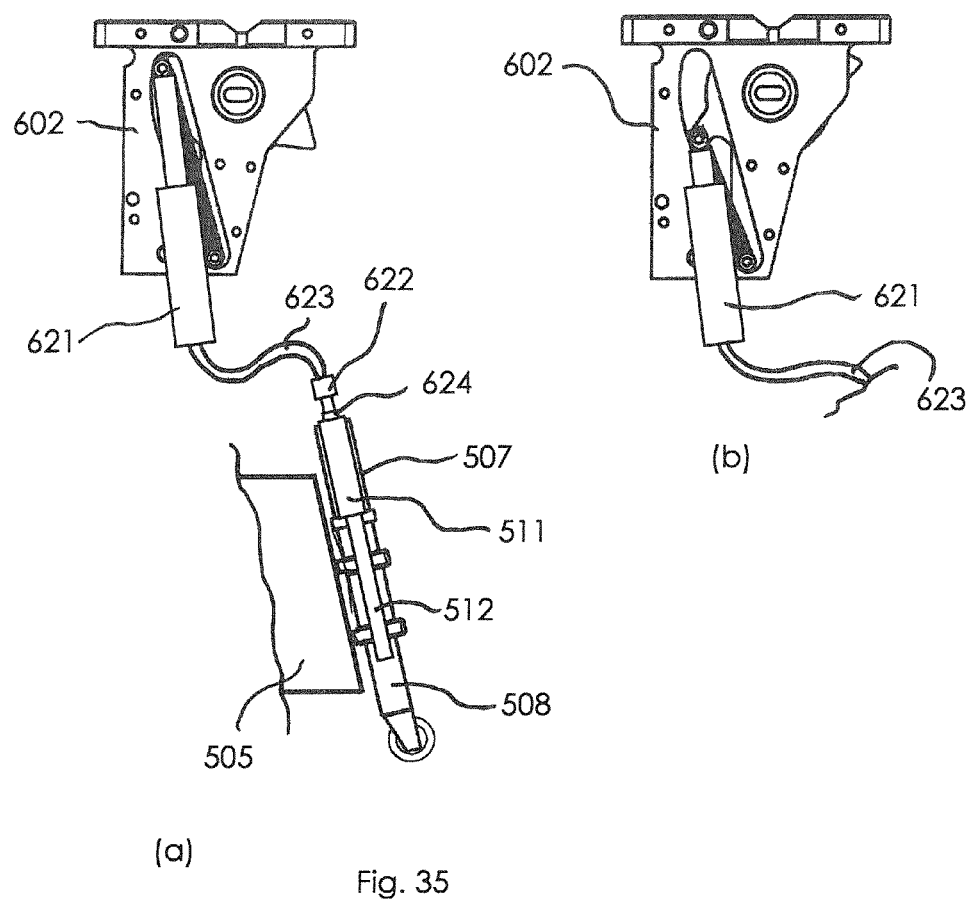
FIG. 35 shows schematically details of the vehicle according to FIGS. 19-22.

Moreover, as it is presented in FIGS. 29 and 35, the connector holder 602 comprises a bracket 620 for a hydraulic cylinder 621. The hydraulic cylinder 621 is hydraulically connected to another hydraulic cylinder 622 a flexible tube 623. The hydraulic cylinder 622 can release an actuator 624 of the gas springs 510 of the telescopic rods 503,504. When the switch element 610 turns in the switch-off position which is shown in FIG. 35 (b) it impinges on the hydraulic cylinder 621 and as a result the hydraulic cylinder 622 releases the actuator 624 so that the gas springs 510 are released and the telescopic rods 503,504 pull out as described above. Alternatively instead of the hydraulic connection, a electrical connection between the shut down device could be provided so that the gas springs 510 could be released electronically as well.

As shown in FIG. 30 (a) a plug-in-side of the connector plug 601 is bevelled on its ends 631,632 in order to fit in a complementary form of the reception recess 604 as shown in FIG. 23 (b). Furthermore the connector plug 601 is provided with a connecting recess 633 for fixing the rope 603. Due to the bevelled ends the connector plug 601 can easily pulled out of the reception recess 604 in directions which are parallel to the longitudinal axis of the reception recess 604 and which are inclined to the perpendicular of the top of the casing (see arrows t in FIG. 31 (a)).

Moreover the connector plug 601 is thinner than the width of the reception recess 604 so that the connector plug 601 can easily pulled out of the reception recess 604 in directions which are perpendicular to the longitudinal axis of the reception recess 604 and are inclined to the perpendicular of the top of the casing (see arrows p in FIG. 31 (b)).

The invention claimed is:

1. A two-wheel battery-powered vehicle comprising: a platform; two wheels connected to the platform; a battery-powered wheel drive driving the two wheels; an attachment connected to the platform; and a sensor device arranged in the platform, wherein a person standing on the platform and engaging the attachment moves the platform into an angle position corresponding to a body position of the person, wherein, based on the angle position of the platform relative to a horizontal position, the sensor device controls the wheel drive such that the wheel drive, by acceleration or deceleration, keeps the vehicle and the person standing on the platform in a balanced position, wherein the attachment has a leg support device for at least one leg of the person standing on the platform in order to keep the platform at a desired angle position, wherein the leg support device has separate shells for a front and a rear side and the front and the rear shell are arranged at different heights.

2. The vehicle according to claim 1, wherein the leg support device is provided to lie on a lower portion of the at least one leg of the person.

3. The vehicle according to claim 1, wherein the leg support device is provided to lie on the leg upon an area of a calf of the person.

4. The vehicle according to claim 1, wherein the shell of the rear side is provided to sit on a calf of the person and the shell of the front side is provided to sit on or above a knee of the person of the person.

5. The vehicle according to claim 1, wherein the positions of the shells are adjustable independently of one another, the shells being adjustable in a vertical and/or horizontal direction and/or pivotable about a vertical and/or a horizontal axis.

6. The vehicle according to claim 5, further comprising an equipment to adjust the position of the shells, the equipment including a spindle drive.

7. The vehicle according to claim 1, wherein the leg support device is provided for swiveling around a vertical axis against the force of a spring.

8. The vehicle according to claim 1, comprising sensor equipment for detecting a swivel angle of the leg support device, the sensor equipment being connected to the sensor device to form a right/left control, wherein the right/left control is operated by swivelling the leg support device.

9. The vehicle according to claim 1, further comprising for each wheel a fender which partially encloses the respective wheel.

10. The vehicle according to claim 9, wherein the fenders fully encloses at least an upper half of the wheels.

11. The vehicle according to claim 9, wherein the fenders enclose the wheels to a height off the ground which corresponds to a height that the vehicle can climb.

12. The vehicle according to claim 9, wherein the fenders comes down to different heights on a front side and on a rear side.

13. The vehicle according to claim 9, wherein the fender are provided for being connected to a chassis and/or a gear box of the vehicle.

14. The vehicle according to claim 9, wherein the fender are provided for carrying a support for an object to be transported.

15. The vehicle according to claim 14, wherein the support is connectable to the body of the person.

16. A two-wheel battery-powered vehicle comprising: a platform; two wheels connected to the platform; a battery-powered wheel drive driving the two wheels; an attachment connected to the platform; and a sensor device arranged in the platform, wherein a person standing on the platform and engaging the attachment moves the platform into an angle position corresponding to a body position of the person, wherein, based on the angle position of the platform relative to a horizontal position, the sensor device controls the wheel drive such that the wheel drive, by acceleration or deceleration, keeps the vehicle and the person standing on the platform in a balanced position, wherein the attachment has a leg support device for at least one leg of the person standing on the platform in order to keep the platform at a desired angle position, further comprising means for automatically stabilizing the vehicle in case of a vehicle cut-off.

17. The vehicle according to claim 16, wherein the stabilizing means comprises at least one extendible support wheel on a front side and on a rear side of the vehicle.

18. The vehicle according to claim 17, wherein the support wheels are arranged on a telescopic rod, wherein the telescopic rod is provided with a spring, by force of which the telescopic rod can be extended.

* * * * *